US011203970B2

(12) United States Patent
DePaoli et al.

(10) Patent No.: US 11,203,970 B2
(45) Date of Patent: Dec. 21, 2021

(54) WASTEGATE ASSEMBLY

(71) Applicant: BorgWarner Inc., Auburn Hills, MI (US)

(72) Inventors: Dominic William DePaoli, Horse Shoe, NC (US); Aaron Date, Asheville, NC (US); Michael Daniel Cola, Fletcher, NC (US); Georg Scholz, Wöllstein (DE); Marc Werner, Bockenau (DE); Christian Cossmann, Kaiserslautern (DE); Jakob Penth, Saarbrücken (DE); Christoph Müller, Kirchheimbolanden (DE); Ravi Patil, Kirchheimbolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/271,911

(22) PCT Filed: Sep. 20, 2019

(86) PCT No.: PCT/US2019/052145
§ 371 (c)(1),
(2) Date: Feb. 26, 2021

(87) PCT Pub. No.: WO2020/061447
PCT Pub. Date: Mar. 26, 2020

(65) Prior Publication Data
US 2021/0317777 A1   Oct. 14, 2021

Related U.S. Application Data

(60) Provisional application No. 62/903,169, filed on Sep. 20, 2019, provisional application No. 62/734,529, filed on Sep. 21, 2018.

(51) Int. Cl.
*F02B 37/18* (2006.01)
*F01D 17/10* (2006.01)

(52) U.S. Cl.
CPC .......... *F02B 37/183* (2013.01); *F01D 17/105* (2013.01); *F02B 37/18* (2013.01); *F05D 2220/40* (2013.01); *F05D 2260/606* (2013.01)

(58) Field of Classification Search
CPC .. F02B 37/183; F01D 17/105; F05D 2220/40; F05D 2260/606
See application file for complete search history.

(56) References Cited

U.S. PATENT DOCUMENTS

| 2,565,108 A | 8/1951 | Zahodiakin |
|---|---|---|
| 5,112,178 A | 5/1992 | Overhues et al. |

(Continued)

FOREIGN PATENT DOCUMENTS

| DE | 10 2010 038 908 A1 | 2/2012 |
|---|---|---|
| DE | 102010038908 A1 | 2/2012 |

(Continued)

OTHER PUBLICATIONS

International Search Report for Application No. PCT/US2019/052079 dated Jan. 2, 2020, 2 pages.

(Continued)

*Primary Examiner* — Audrey B. Walter
*Assistant Examiner* — Edward Bushard
(74) *Attorney, Agent, or Firm* — Howard & Howard Attorneys PLLC

(57) ABSTRACT

A wastegate assembly for controlling flow of exhaust gas includes a valve element having a valve body and a valve shaft. The wastegate assembly further includes a spindle having a head defining an opening and including a flat surface. The wastegate assembly further includes a washer coupled to the valve shaft and spaced from the spindle for (Continued)

securing the spindle to the valve shaft. The washer defines a bottom washer surface facing the flat surface of the spindle head, with the bottom washer surface including a flat region and a beveled region. A biasing member is disposed between the flat surface of the spindle and the flat and beveled regions of the washer. The beveled region extends oblique relative to the flat region for minimizing contact between the washer and the biasing member beyond the flat region.

20 Claims, 5 Drawing Sheets

(56) References Cited

U.S. PATENT DOCUMENTS

| | | | |
|---|---|---|---|
| 5,282,710 | A | 2/1994 | Triesethau |
| 8,500,108 | B2 | 8/2013 | Rode |
| 8,820,709 | B2 | 9/2014 | Lombard et al. |
| 9,127,590 | B2 | 9/2015 | Schoenherr et al. |
| 9,222,406 | B2 | 12/2015 | Lombard et al. |
| 9,464,565 | B2 | 10/2016 | Yamaguchi et al. |
| 9,593,624 | B2 | 3/2017 | Segawa |
| 9,631,628 | B2 | 4/2017 | Takahashi et al. |
| 10,024,229 | B2 | 7/2018 | Byon |
| 10,302,010 | B2 | 5/2019 | Diemer et al. |
| 10,605,115 | B2 | 3/2020 | Iwata |
| 10,920,660 | B2 | 2/2021 | Schawer et al. |
| 2011/0037210 | A1 | 2/2011 | Rode |
| 2012/0234002 | A1 | 9/2012 | Lombard et al. |
| 2013/0189072 | A1 | 7/2013 | Wade |
| 2014/0366530 | A1 | 12/2014 | Murayama et al. |
| 2015/0147162 | A1* | 5/2015 | Stilgenbauer ......... F02B 37/183 415/145 |
| 2015/0285133 | A1 | 10/2015 | Byon |
| 2018/0080370 | A1 | 3/2018 | Genin et al. |
| 2018/0094573 | A1 | 4/2018 | Schoenherr et al. |
| 2018/0223727 | A1 | 8/2018 | Nakajima |
| 2018/0230848 | A1 | 8/2018 | Iwata |
| 2019/0003376 | A1 | 1/2019 | Schawer et al. |
| 2019/0136753 | A1 | 5/2019 | Li et al. |
| 2019/0195270 | A1 | 6/2019 | Lee et al. |
| 2021/0033001 | A1 | 2/2021 | Kato et al. |
| 2021/0108558 | A1 | 4/2021 | Huh |

FOREIGN PATENT DOCUMENTS

| | | |
|---|---|---|
| DE | 10 2011 076361 A1 | 11/2012 |
| DE | 102011076361 A1 | 11/2012 |
| DE | 10 2013 200 832 A1 | 7/2013 |
| DE | 102013200832 A1 | 7/2013 |
| DE | 10 2013 200 065 A1 | 7/2014 |
| DE | 102013200065 A1 | 7/2014 |
| DE | 10 2016 100 900 A1 | 7/2017 |
| DE | 102016100900 A1 | 7/2017 |
| DE | 202017105056 U1 | 9/2017 |
| DE | 20 2018 002 846 U1 | 6/2018 |
| DE | 202018002846 U1 | 6/2018 |
| DE | 10 2017 202 137 A1 | 8/2018 |
| DE | 10 2018 103 283 A1 | 8/2018 |
| DE | 20 2018 103 283 A1 | 8/2018 |
| DE | 102017202137 A1 | 8/2018 |
| DE | 102018103283 A1 | 8/2018 |
| DE | 102018204251 A1 | 9/2019 |
| EP | 2508730 B1 | 6/2014 |
| EP | 3 211 197 A1 | 8/2017 |
| EP | 3211197 A1 | 8/2017 |
| JP | S 61-033923 U | 3/1986 |
| JP | S61033923 U | 3/1986 |
| JP | 2006-047693 A | 4/2006 |
| JP | 2006097693 A | 4/2006 |
| JP | 2013-155687 A | 8/2013 |
| JP | 2013155687 A | 8/2013 |
| WO | 2010135104 A2 | 11/2010 |
| WO | 2013133371 A1 | 9/2013 |
| WO | WO 2013/133371 A1 | 9/2013 |
| WO | 2014011468 A1 | 1/2014 |
| WO | 2019072486 A1 | 4/2019 |
| WO | WO 2019/072486 A1 | 4/2019 |
| WO | 2019105853 A1 | 6/2019 |
| WO | WO 2019/105853 A1 | 6/2019 |

OTHER PUBLICATIONS

International Search Report for Application No. PCT/US2019/052145 dated Dec. 4, 2019, 3 pages.
U.S. Appl. No. 17/019,820, filed Sep. 14, 2020.
U.S. Appl. No. 17/269,362, filed Feb. 18, 2021.
English language abstract and machine-assisted English translation for DE 10 2010 038 908 A1 extracted from espacenet.com database on Mar. 1, 2021, 7 pages.
English language abstract and machine-assisted English translation for DE 10 2011 076 361 A1 extracted from espacenet.com database on Mar. 1, 2021, 10 pages.
Machine-assisted English language abstract for DE 10 2013 200 832 A1 extracted from espacenet.com database on Mar. 1, 2021, 2 pages.
English language abstract and machine-assisted English translation for DE 10 2013 200 065 A1 extracted from espacenet.com database on Mar. 1, 2021, 11 pages.
Machine-assisted English language abstract for DE 10 2016 100 900 A1 extracted from espacenet.com database on Mar. 1, 2021, 2 pages.
Machine-assisted English language abstract and machine-assisted English translation for DE 20 2017 105 056 U1 extracted from espacenet.com database on Mar. 1, 2021, 13 pages.
Machine-assisted English language abstract and machine-assisted English translation for DE 20 2018 002 846 U1 extracted from espacenet.com database on Mar. 1, 2021, 14 pages.
English language abstract for DE 10 2018 103 283 A1 extracted from espacenet.com database on Mar. 1, 2021, 1 page.
English language abstract and machine-assisted English translation for DE 10 2017 202 137 A1 extracted from espacenet.com database on Mar. 1, 2021, 15 pages.
Machine-assisted English language abstract for EP 3 211 197 A1 extracted from espacenet.com database on Mar. 1, 2021, 2 pages.
Machine-assisted English language translation for JPS 61-033923 U extracted from espacenet.com database on Mar. 4, 2021, 3 pages.
English language abstract and machine-assisted English translation for JP 2006-047693 A extracted from espacenet.com database on Mar. 1, 2021, 11 pages.
English language abstract for JP 2013-155687 A extracted from espacenet.com database on Mar. 1, 2021, 1 page.
English language abstract for WO 2013/133371 A1 extracted from espacenet.com database on Mar. 1, 2021, 2 pages.
English language abstract for WO 2019/072486 A1 extracted from espacenet.com database on Mar. 1, 2021, 2 pages.
English language abstract and machine-assisted English translation for WO 2019/105853 A1DE 10 2017 202 137 A1 extracted from espacenet.com database on Mar. 1, 2021, 15 pages.
English language abstract and machine-assisted English translation for DE 10 2018 204 251 A1 extracted from espacenet.com database on Sep. 9, 2021, 13 pages.

\* cited by examiner

US 11,203,970 B2

WASTEGATE ASSEMBLY

CROSS-REFERENCE TO RELATED APPLICATIONS

This application claims the benefit of and priority to U.S. Provisional Patent Application Ser. No. 62/734,529, filed Sep. 21, 2018, which is incorporated herein by reference in its entirety. This application also claims the benefit of and priority to U.S. Provisional Patent Application Ser. No. 62/903,169, filed Sep. 20, 2019, which is incorporated herein by reference in its entirety.

FIELD OF THE DISCLOSURE

The following disclosure is generally directed to a wastegate assembly for a turbocharger.

BACKGROUND OF THE DISCLOSURE

Wastegate assemblies are exposed to high temperatures and corrosive exhaust gas. The high temperatures, corrosive exhaust gas, and prolonged use may degrade certain components of the wastegate assembly and thereby reduce the service life of the wastegate assembly. This degradation may be particularly acute when the wastegate assembly includes a biasing member (e.g. a spring). Thus, there remains an opportunity to develop a wastegate assembly including a biasing member that has improved durability and service life.

SUMMARY OF THE DISCLOSURE AND ADVANTAGES

A wastegate assembly for controlling flow of exhaust gas from an internal combustion engine and through a wastegate channel of a turbocharger is disclosed herein. The wastegate includes a valve element having a valve body and a valve shaft extending away from the valve body. The valve shaft extends along an axis between a first end and a second end spaced from the first end along the axis. The valve element is moveable between a first position and a second position to control the flow of exhaust gas through the wastegate channel of the turbocharger. The wastegate assembly further includes a spindle having a head defining an opening for receiving the valve shaft and for moving the valve element between the first and second positions. The wastegate assembly further includes a washer coupled to the valve shaft and spaced from the spindle along the axis such that the spindle is disposed between the valve body and the washer for securing the spindle to the valve shaft. The wastegate assembly further includes a biasing member disposed between the spindle and the washer. The washer includes a bottom surface facing the spindle head and including a flat region and a beveled region. The flat region is substantially parallel with a flat surface of the spindle head and configured to contact the biasing member. The beveled region extends oblique relative to the flat region for minimizing contact between the washer and the biasing member beyond the flat region. Minimizing contact between the washer and the biasing member beyond the flat region reduces or eliminates over-compression of the biasing member and thereby protects and prolongs the service life of the biasing member.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

In exhaust gas turbocharging, some of the exhaust gas flow, which would normally be exhausted to the environment, is used to drive a turbine. The turbine includes a turbine wheel that is mounted on a shaft and is rotatably driven by exhaust gas flow. The turbocharger returns some of this normally-wasted exhaust gas energy back into the engine, contributing to the engine's efficiency and saving fuel. A compressor, which is driven by the turbine, draws in filtered ambient air, compresses it, and then supplies the compressed air to the engine. The compressor includes a compressor wheel that is mounted on the same shaft so that rotation of the turbine wheel causes rotation of the compressor wheel.

This disclosure focuses on a wastegate assembly 10 for selectively bypassing a portion of the exhaust gas. By selectively allowing exhaust gas to bypass the turbine wheel, the wastegate assembly 10 selectively reduces the turbocharger's output (or boost). Thus, the wastegate assembly 10 regulates exhaust gas flow and ensures that the turbine wheel is spun at a desirable speed. Said differently, the wastegate assembly 10 regulates exhaust gas flow to prevent the turbine wheel from being spun at an undesirable speed.

A turbocharger with the wastegate assembly 10 often has an actuator (e.g. a mechanical actuator) for controlling the wastegate assembly 10. In other words, the actuator moves the wastegate assembly 10 between a first position and a second position. The first position is the closed position, which allows the full volume of exhaust gas to pass through to the turbocharger. The second position is an open position, which may permit the full volume of exhaust gas to bypass the turbocharger. Of course, the actuator my also position the wastegate assembly 10 in a position between the first and second position to bypass a portion of the volume of exhaust gas (e.g. 30% by volume).

Figure 1:
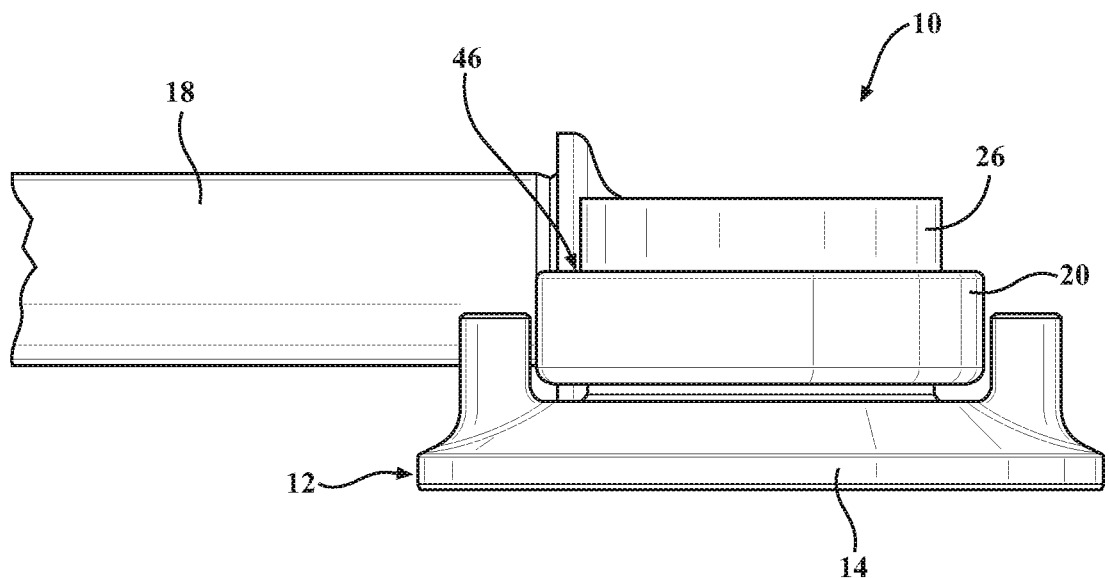
FIG. 1 is a side view of a wastegate assembly.
Figure 2:
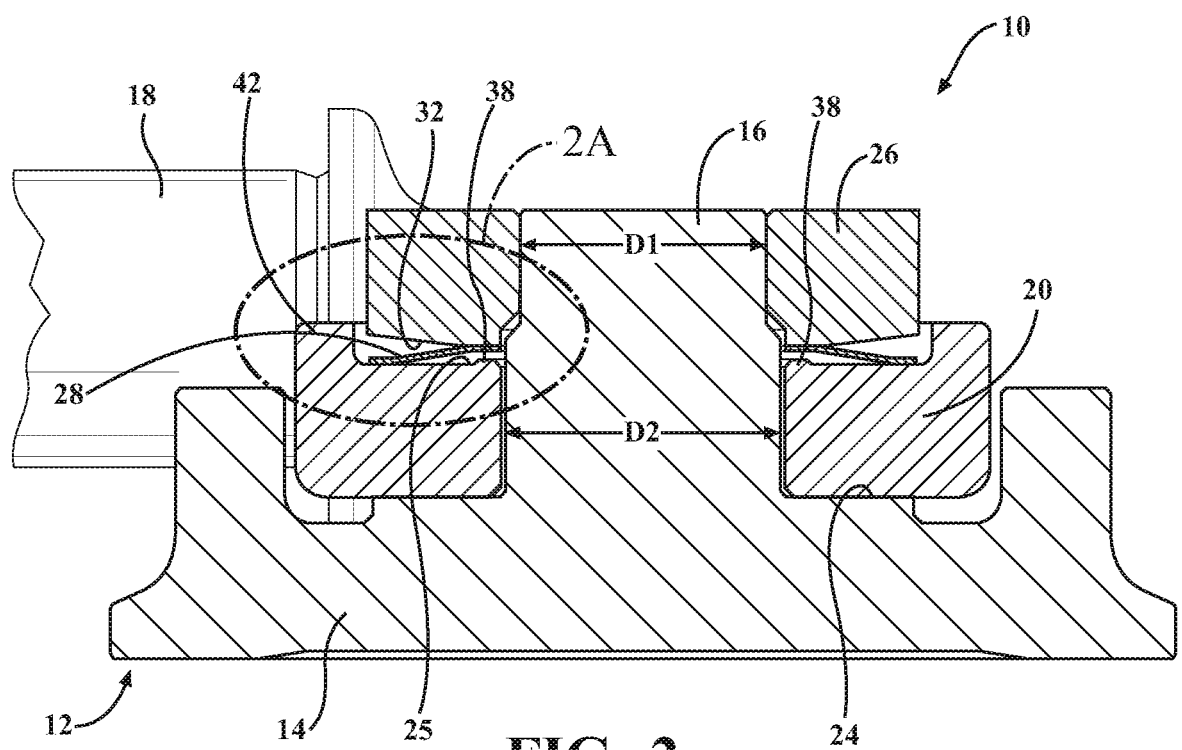
FIG. 2 is a partial cross-sectional view of an embodiment of the wastegate assembly with a spindle head, a washer, a biasing member, and a valve element shown in cross-section.
Figure 3:
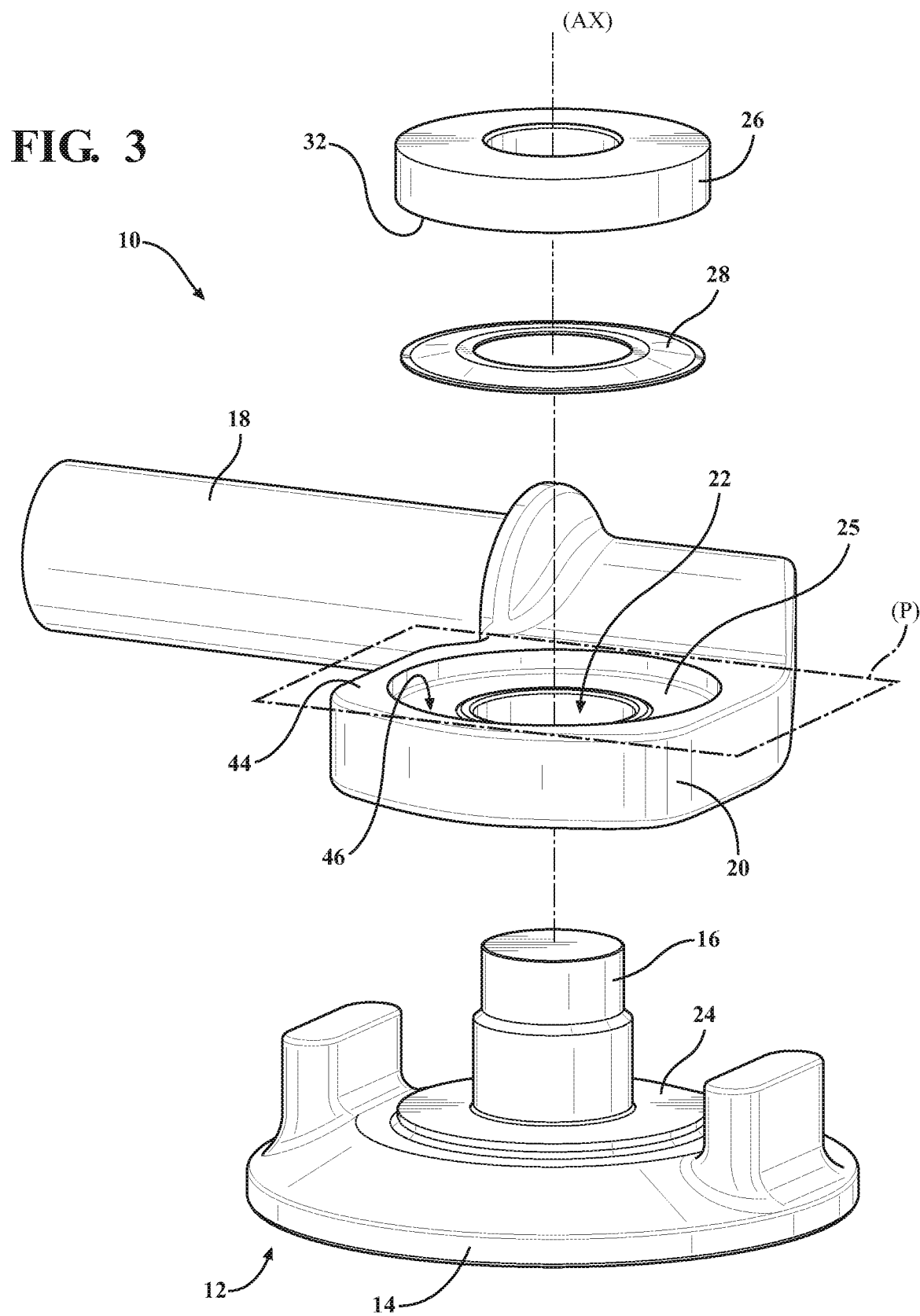
FIG. 3 is an exploded view of the embodiment of the wastegate assembly shown in FIG. 2.
Figure 4:
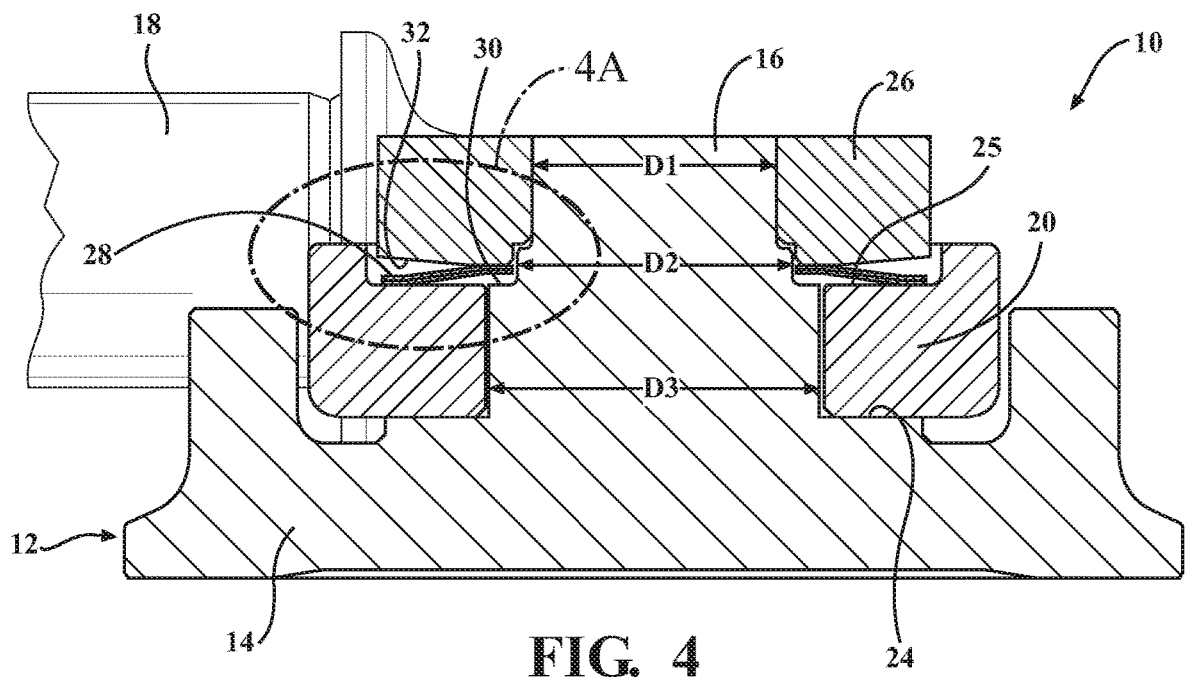
FIG. 4 is a partial cross-sectional view of an embodiment of the wastegate assembly with a spindle head, a washer, two biasing members, and a valve element shown in cross-section.
Figure 5:
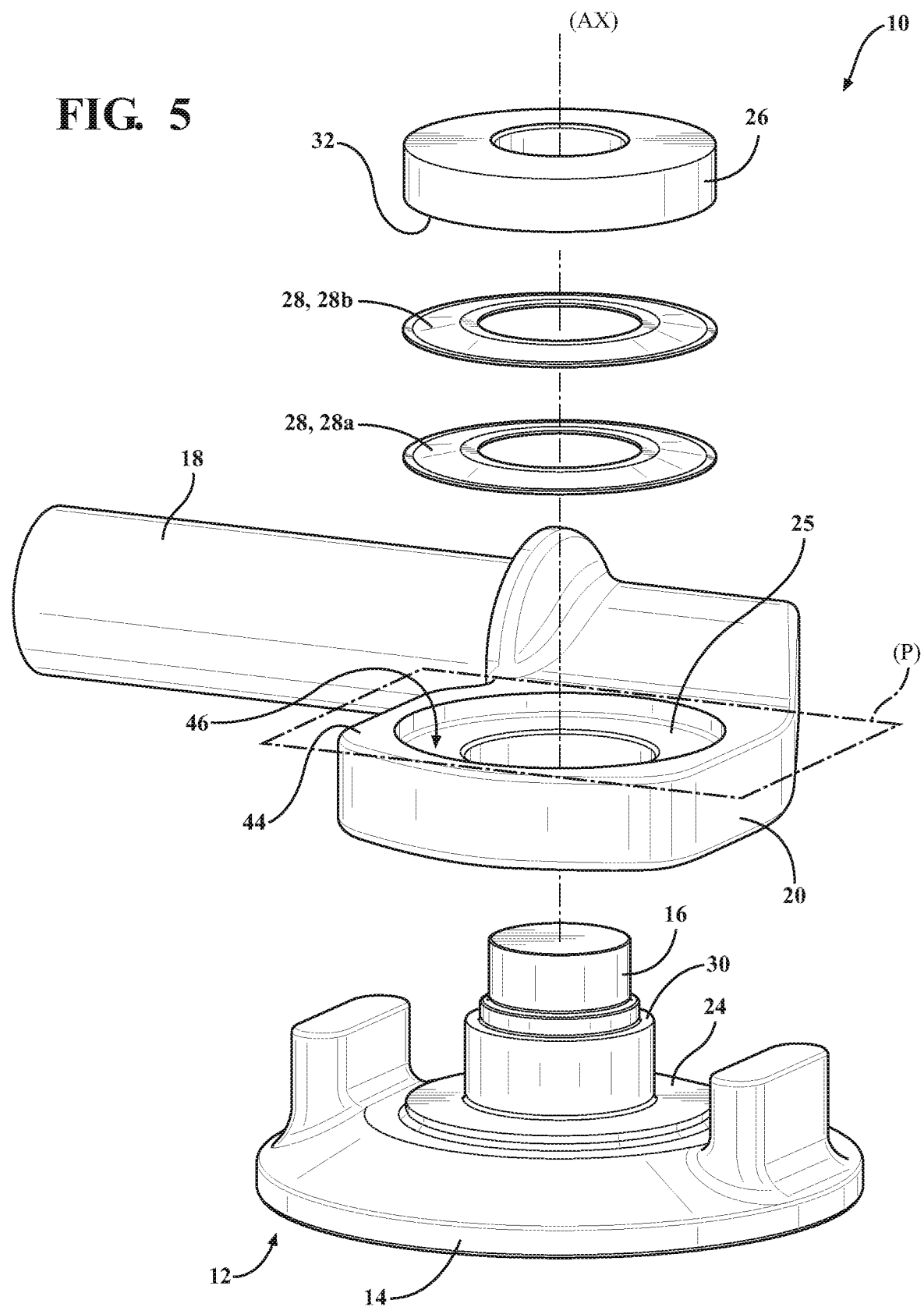
FIG. 5 is an exploded view of the embodiment of the wastegate assembly shown in FIG. 4.

As shown in FIGS. 1-5, the wastegate assembly 10 includes a valve element 12 having a valve body 14. The valve element 12 also includes a valve shaft 16 extending away from the valve body 14. As best shown in FIGS. 3 and 5, the valve shaft 16 extends along an axis (AX). When the wastegate assembly 10 is in the first position, the valve element 12 prevents exhaust gas from bypassing the turbocharger. In contrast, when the wastegate assembly 10 is in the second position, the valve element 12 is positioned to allow at least a portion of exhaust gas to bypass the turbocharger.

As further shown in FIGS. 1-5, the wastegate assembly 10 also includes a spindle 18, which is also commonly referred to as a lever. The spindle 18 is typically coupled to the actuator for moving the wastegate assembly 10 between the first and second positions. As best shown in FIG. 4, the spindle 18 includes a head 20 defining an opening 22 for receiving the valve shaft 16. Because the spindle 18 receives the valve shaft 16, when the actuator acts upon the spindle 18, the valve element 12 is moved through its connection to the spindle 18. As shown in FIGS. 2-5, typically the spindle 18 abuts the valve element 12 at a top surface 24 of the valve body 14. As shown throughout FIGS. 2, 2A, 4, and 4A, the spindle includes a flat surface 25 facing the washer 26. The flat surface 25 of the spindle head 20 extends generally perpendicular to the axis (AX).

As shown in FIG. 2, the washer 26 is coupled to the valve shaft 16 and spaced from the spindle 18 along the axis (AX) such that the spindle head 20 is disposed between the valve body 14 and the washer 26 for securing the spindle 18 to the valve shaft 16. Typically, the washer 26 is welded to the valve shaft 16. Of course, the washer 26 may be attached to the valve shaft 16 by any suitable means, such as, for example, a compression fit or mechanical interlock. It is to be appreciated that the washer 26 secures the spindle 18 to the valve shaft 16 because coupling the washer 26 to the valve shaft 16 effectively sandwiches the spindle head 20 between the valve body 14 and the washer 26. Said differently, because the washer 26 is attached to the valve shaft 16 and sandwiches the spindle head 20 between itself 26 and the valve element 12, the washer 26 effectively secures the spindle 18 to the valve shaft 16 despite the fact that the spindle 18 itself may not be absolutely fixed to the valve shaft 16 via a weld or some other form of mechanical attachment.

As shown throughout FIGS. 2-5, the wastegate assembly 10 further includes a biasing member 28 disposed between the spindle head 20 and the washer 26. The biasing member 28 typically reduces or eliminates vibration/rattling or any sound that would otherwise occur from the spindle head 20 vibrating and/or moving between the valve element 12 and the washer 26. Although not required, in certain embodiments, the biasing member 28 is a cup spring. As best shown in FIGS. 3 and 5, when the biasing member 28 is the cup spring, the cup spring is disposed around the valve shaft 16, which retains the position of the cup spring between the washer 26 and spindle head 20.

Referring back to the valve shaft, the valve shaft 16 may have various configurations. The valve shaft 16 typically has a circular cross-sectional shape. The diameter of the valve shaft 16 may advantageously vary to assist with the assembly of the wastegate assembly 10. For example, as shown in FIG. 2, the valve shaft 16 may have a first diameter (D1) about the washer 26 and a second diameter (D2) about the spindle head 20 with the second diameter (D2) being relatively larger than the first diameter (D1). This configuration assists with assembling and locating the spindle head 20, biasing member 28, and washer 26 about the valve shaft 16. For example, when the opening 22 of the spindle head 20 is initially disposed around the valve shaft 16, the diameter of the valve shaft 16 is the first diameter (D1) (i.e., the smaller of the diameters), which easily allows the opening 22 to be disposed around the valve shaft 16.

Figure 4A:
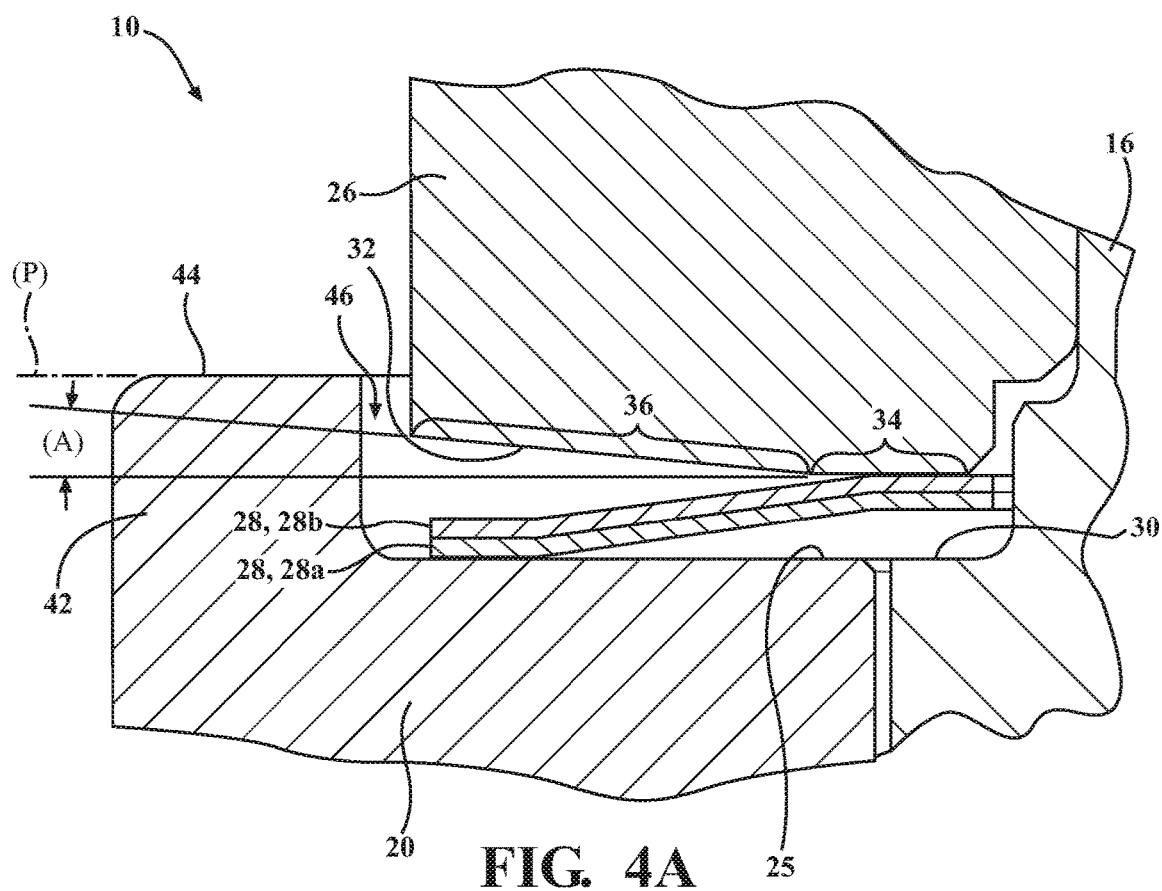
FIG. 4A is an enlarged view of a portion of FIG. 4.

Still further, as shown in FIG. 4, the valve shaft 16 may also include a third diameter (D3) with the third diameter (D3) being larger than both first and second diameters (D1, D2). As also shown in FIGS. 4 and 4a, when the valve shaft 16 includes the third diameter (D3) the valve shaft 16 may also define a shaft support surface 30 adjacent to the flat surface 25 of the spindle head 20. In this configuration, typically at least a portion of the biasing member 28 is disposed between said shaft support surface 30 and the flat region of the washer 26. This arrangement is beneficial when the washer 26 is welded to the valve shaft 16 because it prevents the portion of the biasing member 28 disposed between the shaft support surface 30 and the flat region of the washer 26 from over compressing the biasing member 28 due to the fact that the distance between the shaft support surface 30 and the flat region of the washer 26 is fixed via the welding of the washer 26 to the valve shaft 16.

Referring back to the washer 26, the washer 26 defines a bottom washer surface 32 facing the spindle head 20. The bottom surface 32 of the washer 26 includes at least two regions. The first region is adjacent to the valve shaft 16 and is generally referred to as a flat region 34 (see FIGS. 2A and 4A). The flat region 34 is typically substantially parallel with the opposing surface (i.e., the flat surface 25) of the spindle head 20. The flat region 34 is also typically substantially perpendicular to the axis (AX). For the purposes of this disclosure, the terms "substantially parallel" and "substantially perpendicular" mean+/−2° of the true parallel perpendicular. For example, the flat region 34 may be slightly off parallel (+/−2°) with the flat surface 25 of the spindle head 20 when the spindle head 20 is slightly tilted (e.g. upon actuation) with respect to the washer 26. In one embodiment, when the valve shaft 16 includes the shaft support surface 30, at least a portion of the biasing member 28 is disposed between the shaft support surface 30 and the flat region 34. This arrangement is beneficial when the washer 26 is welded to the valve shaft 16 because it prevents the portion of the biasing member 28 disposed between the shaft support surface 30 and the flat region 34 of the washer 26 from over compressing the biasing member 28 due to the fact that the distance between the shaft support surface 30 and the flat region 34 of the washer 26 is fixed via the welding of the washer 26 to the valve shaft 16.

The second region of the bottom surface 32 is a beveled region 36 located adjacent the flat region 34 and spaced from the valve shaft 16. The beveled region 36 extends oblique relative to the flat surface 25 of the spindle head 20 and oblique relative to the flat region 34 of the bottom surface 32 of the washer 26. In particular, the distance between the beveled region 36 and the flat surface 25 of the spindle head 20 is greater than the distance between the flat region 34 of the washer 26 and the flat surface 25 of the spindle head 20. In addition, the distance between the beveled region 36 and the flat surface 25 of the spindle head 20 continues to increase along the beveled region 36 as the beveled region continues to obliquely extend from the flat region 34. This particular configuration of the bottom surface 32 of the washer 26 results in the biasing member 28 being compressed between two parallel surfaces (i.e., the flat region 34 of the washer 26 and the flat surface 25 of the spindle head 20). In other words, this particular configuration of the bottom surface 32 of the washer 26 minimizes contact between the biasing member 28 with the washer 26 beyond the flat region 34. Said differently, this particular configuration of the bottom surface 32 of the washer 26 isolates the compression of the biasing member 28 to between the washer 26 and the flat region 34. Controlling the point of compression of the biasing member 28 is advantageous because it avoids over-compression of the biasing member 28 and avoids compressing the biasing member 28 in regions of the biasing member 28 not specifically designed for compression. For example, when the biasing member 28 is a cup spring, the compression may be directed towards the inner diameter of the cup spring, which is typically more elastic than the outer diameter of the cup spring.

Referring still to the benefits of the beveled region 36, as described above, typically the spindle head 20 is secured between the valve element 12 and the washer 26 with the washer 26 being coupled (e.g. welded to) the valve shaft 16. In this configuration, the spindle head 20 is secured to the valve shaft 16 by disposing the spindle head 20 between the valve body 14 and the washer 26 and is not typically welded to the valve shaft 16. Thus, when the actuator acts on the spindle 18 to move the wastegate assembly 10 between the first and second positions, the spindle head 20 may tilt a relatively minor amount relative to the washer 26. However, even when the spindle head 20 tilts relative to the washer 26, the beveled region 36 of the washer 26 still prevents or reduces contact between the biasing member 28 and the washer 26 beyond the flat region 34.

Figure 2A:
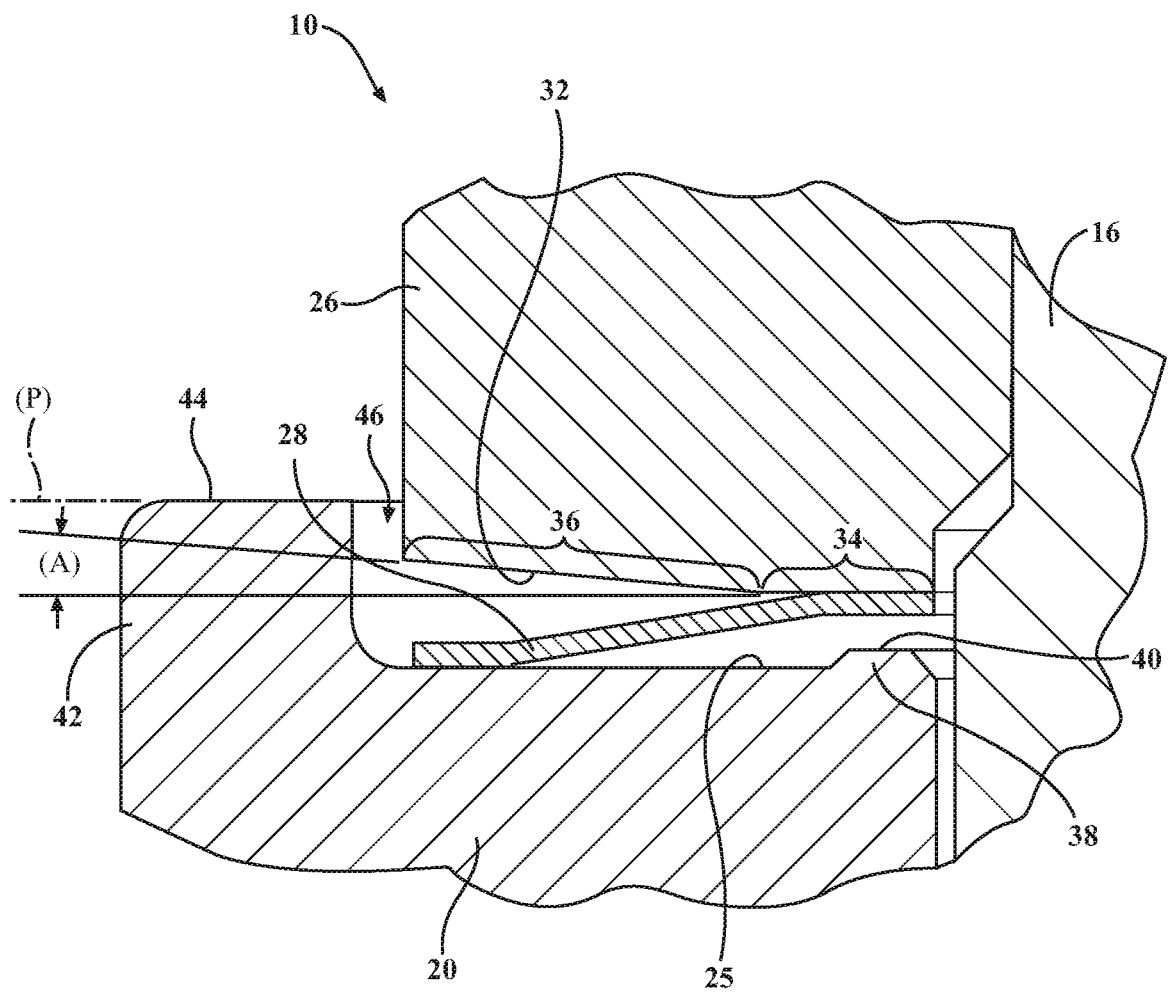
FIG. 2A is an enlarged view of a portion of FIG. 2.

The angle (A) of the beveled region 36 is not particularly limited provided the angle is sufficient for minimizing contact between the washer 26 and the biasing member 28 beyond the flat region 34, the angle may be from 1 to 15°. Alternatively, the angle (A) may be from 1 to 12, 1 to 9, 1 to 6, 3 to 15, 6 to 15, 9 to 15, 3 to 12, or from about 6 to 9, °. The beveled region and angle (A) are best shown in FIGS. 2A and 4A. It should also be appreciated that the beveled region 36 of the washer 26 is not observable in FIGS. 1, 3 and 5 due to the perspective view of the washer 26.

In certain embodiments, such as the embodiment shown in FIGS. 2 and 2A, the spindle head 20 may include an axial stop 38 extending from the flat surface 25 towards the flat region 34 of the washer 26. Typically, the axial stop 38 is located adjacent the inner diameter of the spindle head 20 and adjacent to the valve shaft 16. In this configuration, a portion of the biasing member 28 is disposed over the axial stop 38. The result of this placement of the biasing member 28 is that when the biasing member 28 is compressed between the spindle head 20 and the washer 26, the biasing member 28 is prevented from being overly compressed (e.g. crushed or flattened) by the axial stop 38. For example, when the biasing member 28 is a cup spring, the axial stop 38 prevents the cup spring from being flattened and prevents the cup spring from "flipping over" (i.e., directionally inverting). Preventing the biasing member 28 from being overly compressed generally extends the service life of the biasing member 28, particularly when the biasing member 28 is also exposed to corrosive gas and high temperatures.

The height of the axial stop 38 can be selected based on the particular geometry of the biasing member 28. For example, a relatively lesser compression of the biasing member 28 can be achieved by increasing the relative extension of the axial stop 38. In addition, as best shown in FIG. 2A, typically the top surface 40 of the axial stop 38 is substantially parallel with the corresponding bottom surface 32, particularly the flat region 34, of the washer 26. It should be appreciated that the height of the axial stop in FIGS. 2 and 2A is exaggerated for ease of illustration.

The wastegate assembly 10 may also be configured to reduce the exposure of the biasing member 28 to exhaust gas and high temperatures. As best shown in FIGS. 2A, 3, 4A and 5, the spindle head 20 may also include a raised lip 42 extending from the flat surface 25 generally parallel to the axis (AX), such that the spindle head 20 defines a courter bore chamber 46. The washer 26 may also be sized such that a diameter of the washer 26 fits within the counter bore chamber 46 to shield the biasing member 28 from exhaust gas and high temperatures. More specifically, the raised lip 42 extends to a distal end 44 above the flat surface 25 of the spindle head 20 such that a plane (P) can be defined extending from the distal end 44 and perpendicular to the axis (AX). The space below the plane P and above the flat surface 25 of the spindle head 20 defines the counter bore chamber 46. Sizing the washer 26 to have a diameter to fit with the counter bore chamber 46, and fixing the washer 26 such that the bottom washer surface 32 is below the plane P results in the raised lip 42 and the washer 26 cooperating to reduce the exposure of the biasing member 28 to exhaust gas, thereby protecting the biasing member 28 and extending the service life of the biasing member 28. For example, as best shown in FIG. 1, the cooperation of the raised lip 42 and washer 26 shield the biasing member 28 from a side view of the wastegate assembly 10 (i.e., the biasing member 28 is not observable in FIG. 1 because it resides in the counter bore chamber 46).

Referring back to the biasing member 28, in certain embodiments, such as the embodiment in FIGS. 3-5, the biasing member 28 is a plurality of cup springs including at least a first and a second cup spring (28a, 28b). The first cup spring 28a is supported on the flat surface 25 of the spindle head 20. The second cup spring 28b is not supported on the flat surface 25 of the spindle head 20. Instead, the second cup spring 28b is orientated substantially identical to the first cup spring 28a and disposed directly on and supported by the first cup spring 28a. In addition, the first cup spring 28a and the second cup spring 28b are typically identical (i.e., are the same type of cup spring). In other words, because the first and second cup springs (28a, 28b) are typically identical, disposing the second cup spring 28b on the first cup spring 28a results in a stacked configuration, which is may also be referred to a parallel configuration.

Typically, each cup spring in the plurality of cup springs are not physically secured to each other (e.g. by a weld or another mechanical connection). A suitable cup spring is disclosed in U.S. Pat. No. 9,127,590, which is hereby incorporated by reference in its entirety. It should also be appreciated that although two cup springs are shown in FIGS. 4, 4A and 5, the plurality of cup springs may include more than two cup springs. For example, the plurality of cup springs may include 3, 4, 5, 6, or even 7 cup springs. In embodiments with the plurality of cup springs including more than two cup springs, each additional cup spring is oriented identical to the first cup spring 28a and disposed directly on an adjacent cup spring. For example, when the plurality of cup springs include the first and second cups springs and further include a third cup spring, the first cup spring 28a is disposed on the flat surface 25 of the spindle head 20 and around the valve shaft 16, the second cup spring 28b is oriented in a substantially identical manner and disposed on the first cup spring 28a and the third cup spring is oriented in a substantially identical manner to the first and second cup springs (28a, 28b) and disposed directly on the second cup spring 28b.

Including the plurality of cup springs is advantageous because the first cup spring 28a is thermally protected and shielded from exhaust gas by the second cup spring 28b. Similarly, if more than two cup springs are included, the second cup spring 28b is thermally protected and shielded from exhaust gas by the third cup spring. This thermal protection and shielding advantageously results in reduced spring relaxation and prolonged service life, in comparison to the inclusion of a single cup spring, even if the single cup spring is similarly sized to the plurality of cup springs. In particular, the oxidation of the first cup spring 28a will be improved compared to a single cup spring of comparable thickness because of this shielding. In addition, the plurality of cup springs 28 in this orientation has an overall spring coefficient that is twice the amount of a single cup spring. For a given travel, the max stress principle in each spring is half of the normal value for this configuration. Accordingly, the relaxation performance shows an improvement of over 50%. Additionally, the wear in each contacting area is reduced to a minimum, because the plurality of cup springs 28 is producing a max amount of frictional work in each layer.

This disclosure has been described in an illustrative manner, and it is to be understood that the terminology which has been used is intended to be in the nature of words of description rather than of limitation. Many modifications and variations of the present disclosure are possible in light of the above teachings, and the wastegate assembly described above may be practiced otherwise than as specifically described.

What is claimed is:

1. A wastegate assembly for controlling flow of exhaust gas from an internal combustion engine and through a wastegate channel of a turbocharger, said wastegate assembly comprising:
a valve element having a valve body and a valve shaft extending away from said valve body, with said valve shaft extending along an axis, and with said valve element moveable between a first position and a second position to control the flow of exhaust gas through the wastegate channel of the turbocharger;
a spindle having a head defining an opening for receiving said valve shaft for moving said valve element between said first position and said second position, with said spindle head comprising a flat surface;
a washer coupled to said valve shaft and spaced from said spindle along said axis such that said spindle is disposed between said valve body and said washer for securing said spindle to said valve shaft, wherein said washer defines a bottom washer surface facing said flat surface of said spindle head, with said bottom washer surface comprising a flat region and a beveled region; and
a biasing member disposed between said flat surface of said spindle and both said flat and beveled regions of said washer;
wherein said flat region of said washer is substantially parallel with said flat surface of said spindle head and configured to contact said biasing member, and said beveled region extends oblique relative to said flat region for minimizing contact between said washer and said biasing member beyond said flat region.

2. The wastegate assembly as set forth claim 1 wherein said beveled region extends obliquely away relative to said flat region at an angle of from 1 to 15°.

3. The wastegate assembly as set forth in claim 1 wherein said biasing member is a cup spring.

4. The wastegate assembly of claim 1 wherein said washer is welded to said valve shaft.

5. A turbocharger comprising the wastegate assembly as set forth in claim 1.

6. The wastegate assembly as set forth in claim 1 wherein said spindle comprises an axial stop extending from said spindle head towards said washer with said axial stop configured to prevent over compression of said biasing member as said biasing member is compressed between said washer and said spindle.

7. The wastegate assembly as set forth in claim 6 wherein said axial stop extends from said flat surface of said spindle head towards said flat region of said washer.

8. The wastegate assembly as set forth in claim 1 wherein said valve shaft includes at least a first diameter (D1) and a second diameter (D2), with said first diameter (D1) less than said second diameter (D2) for aligning said spindle head and said washer with said valve shaft.

9. The wastegate assembly as set forth in claim 8 wherein said valve shaft further includes a third diameter (D3) adjacent said washer and defines a shaft support surface adjacent said flat surface of said spindle head, wherein at least a portion of said biasing member is disposed between said shaft support surface and said flat region of said washer.

10. The wastegate assembly as set forth in claim 1 wherein said biasing member is further defined as a plurality of cup springs including at least a first and a second cup spring, wherein said first cup spring is supported on said flat surface of said spindle head and said second cup spring is orientated substantially identical to said first cup spring and disposed directly on said first cup spring.

11. The wastegate assembly as set forth in claim 10 wherein said plurality of cup springs consists of said first cup spring and said second cup spring.

12. The wastegate assembly as set forth in claim 1 wherein said spindle head includes a raised lip extending from said flat surface of said spindle to a distal end.

13. The wastegate assembly as set forth in claim 12 wherein said bottom washer surface is located entirely between a plane, which extends from said distal end of said raised lip and perpendicular to said valve shaft, and said flat surface of said spindle head for shielding said biasing member from exhaust gas.

14. The wastegate assembly as set forth in claim 12 wherein said raised lip of said head of said spindle is located about an outer perimeter of said head.

15. The wastegate assembly as set forth in claim 12 wherein said biasing member is disposed between said raised lip of said spindle head and said valve shaft.

16. A wastegate assembly for controlling flow of exhaust gas from an internal combustion engine and through a wastegate channel of a turbocharger, said wastegate assembly comprising:
a valve element having a valve body and a valve shaft extending away from said valve body, with said valve shaft extending along an axis, with said valve element moveable between a first position and a second position to control the flow of exhaust gas through the wastegate channel of the turbocharger;
a spindle having a head defining an opening for receiving said valve shaft for moving said valve element between said first position and said second position, with said spindle head comprising a flat surface;
a washer coupled to said valve shaft and spaced from said spindle along said axis such that said spindle is disposed between said valve body and said washer for securing said spindle to said valve shaft, wherein said washer defines a bottom washer surface facing said flat surface of said spindle head, with said bottom washer surface comprising a flat region and a beveled region; and
a biasing member disposed between said flat surface of said spindle and both said flat and beveled regions of said washer;
wherein said flat region of said washer is substantially parallel with said flat surface of said spindle head and configured to contact said biasing member, and said beveled region extends obliquely away relative to said flat region at an angle of from 1 to 15° for minimizing contact between said washer and said biasing member beyond said flat region, wherein said spindle comprises an axial stop extending from said flat surface of said spindle head towards said flat region of said washer with said axial stop configured to prevent over compression of said biasing member as said biasing member is compressed between said washer and said spindle.

17. The wastegate assembly as set forth in claim 16 wherein said spindle head includes a raised lip extending from said flat surface of said spindle to a distal end and wherein said bottom washer surface is located entirely between (1) a plane extending from said distal end of said raised lip and perpendicular to said valve shaft and (2) said flat surface of said spindle head for shielding said biasing member from exhaust gas.

18. A turbocharger comprising the wastegate assembly as set forth in claim 16.

19. The wastegate assembly as set forth in claim 16 wherein said biasing member is further defined as a plurality of cup springs including at least a first and a second cup spring, wherein said first cup spring supported on said flat surface of said spindle head and said second cup spring orientated substantially identical to said first cup spring and disposed directly on said first cup spring.

20. The wastegate assembly as set forth in claim 19 wherein said plurality of cup springs consists of said first cup spring and said second cup spring.

* * * * *